US012592740B2

(12) United States Patent
Suzuki et al.

(10) Patent No.: US 12,592,740 B2
(45) Date of Patent: Mar. 31, 2026

(54) WIRELESS COMMUNICATION DEVICE AND WIRELESS COMMUNICATION METHOD

(71) Applicant: JVCKENWOOD Corporation, Yokohama (JP)

(72) Inventors: Yasuma Suzuki, Yokohama (JP); Takashi Kawada, Yokohama (JP); Hiroyuki Nakajima, Yokohama (JP); Kazuki Takamiya, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 347 days.

(21) Appl. No.: 18/494,991

(22) Filed: Oct. 26, 2023

(65) Prior Publication Data

US 2024/0056118 A1      Feb. 15, 2024

Related U.S. Application Data

(63) Continuation of application No. PCT/JP2022/008522, filed on Mar. 1, 2022.

(30) Foreign Application Priority Data

Apr. 26, 2021      (JP) ................................. 2021-073980

(51) Int. Cl.
H04B 1/40 (2015.01)
H04M 1/65 (2006.01)
(52) U.S. Cl.
CPC ............... H04B 1/40 (2013.01); H04M 1/65 (2013.01)
(58) Field of Classification Search
CPC ................................... H04M 1/65; H04B 1/40
(Continued)

(56) References Cited

U.S. PATENT DOCUMENTS 4,700,376 A * 10/1987 Ohya .................... H04M 1/652
379/74
4,882,746 A * 11/1989 Shimada ........... H04M 1/72505
455/462
(Continued)

FOREIGN PATENT DOCUMENTS

JP          H08289003 A      11/1996

OTHER PUBLICATIONS

International Search Report for the corresponding PCT Application No. PCT/JP2022/008522 mailed May 10, 2022, 4 pages.
(Continued)

*Primary Examiner* — Binh Kien Tieu
(74) *Attorney, Agent, or Firm* — Shih IP Law Group, PLLC

(57)          ABSTRACT

A device state detector of a given device detects a device state and outputs it as device state information in association with whether it is a transmission standby state. A transmitter transmits a radio wave for a transmission voice signal and the device state information. A receiver outputs a received signal to a signal processor that decodes it into a reception voice signal and device state information of a counterpart device. A recorder records the transmission and reception voice signals. A memory unit stores the pieces of device state information of the device and the counterpart device. A recording determination unit determines whether to continue or stop recording by the recorder. The recording determination unit determines to stop recording if both of the devices are not in a transmission standby state at the time of termination of transmission or reception of a radio wave for the voice signal.

5 Claims, 11 Drawing Sheets

(58) Field of Classification Search
USPC .......................................................... 379/68
See application file for complete search history.

(56) References Cited

U.S. PATENT DOCUMENTS

| | | | | |
|---|---|---|---|---|
| 5,220,594 A * | 6/1993 | Ohnishi | .................. | H04M 1/65 |
| | | | | 379/67.1 |
| 5,535,262 A * | 7/1996 | Kanzawa | ............... | H04Q 3/625 |
| | | | | 379/198 |
| 5,742,846 A * | 4/1998 | Furuya | .................. | H04M 1/247 |
| | | | | 710/20 |
| 8,687,938 B2 * | 4/2014 | Kodama | ............... | H04N 5/765 |
| | | | | 386/292 |
| 2003/0072421 A1 * | 4/2003 | Hosomi | ............... | H04M 1/715 |
| | | | | 379/67.1 |
| 2006/0072406 A1 * | 4/2006 | Moteki | ............... | G11B 27/034 |
| | | | | 369/47.1 |

OTHER PUBLICATIONS

International Preliminary Examination Report on Patentability (I) for the corresponding PCT Application No. PCT/JP2022/008522 mailed Oct. 24, 2023, 8 pages.

* cited by examiner

FIG.5

| HOOK STATE OF MICROPHONE | | DETERMINATION |
|---|---|---|
| WIRELESS COMMUNICATION DEVICE A | WIRELESS COMMUNICATION DEVICE B | |
| OFF | OFF | CONTINUE RECORDING |
| OFF | ON | CONTINUE RECORDING |
| ON | OFF | CONTINUE RECORDING |
| ON | ON | STOP RECORDING |

FIG.11

| HOOK STATE OF MICROPHONE | | | DETERMINATION |
|---|---|---|---|
| WIRELESS COMMUNICATION DEVICE A | WIRELESS COMMUNICATION DEVICE B | WIRELESS COMMUNICATION DEVICE C | |
| OFF | OFF | OFF | CONTINUE RECORDING |
| OFF | OFF | ON | CONTINUE RECORDING |
| OFF | ON | OFF | CONTINUE RECORDING |
| OFF | ON | ON | CONTINUE RECORDING |
| ON | OFF | OFF | CONTINUE RECORDING |
| ON | OFF | ON | CONTINUE RECORDING |
| ON | ON | OFF | CONTINUE RECORDING |
| ON | ON | ON | STOP RECORDING |

WIRELESS COMMUNICATION DEVICE AND WIRELESS COMMUNICATION METHOD

CROSS-REFERENCE TO RELATED APPLICATION

This application is a continuation of application No. PCT/JP2022/008522, filed on Mar. 1, 2022, and claims the benefit of priority from the prior Japanese Patent Application No. 2021-073980, filed on Apr. 26, 2021, the entire content of which is incorporated herein by reference.

BACKGROUND

1. Field of the Disclosure

The present invention relates to a wireless communication device and a wireless communication method.

For example, wireless communication devices installed in vehicles are used for wireless communication between vehicle operation control centers and vehicles and between vehicles. Some wireless communication devices have a function of automatically recording voice transmitted or received wirelessly.

Patent Literature 1 describes a conventional automatic call recorder. This automatic call recorder has a recording and playback device that performs recording and playback on a recording medium that can be randomly accessed. The automatic call recorder records voice signals of a call made by a telephone in the recording medium by the recording and playback device during an off-hook period according to detection output from a detection circuit that detects the on-hook and off-hook of a telephone.

[Patent Literature 1] Japanese Patent Application Publication No. H08-289003

SUMMARY

In the automatic call recorder for telephones, which is full-duplex communication, described in Patent Literature 1, the start and end of a conversation can be clearly known in the hook state of a telephone, and both transmitted voice and received voice can be recorded as a series of conversations during a period from the off-hook state to the on-hook state. On the other hand, a wireless communication device using the Push to Talk (PTT) method, which is half-duplex communication, is usually in a standby state for reception, and when a radio wave is received, the wireless communication device outputs the received voice from the speaker. For transmission, the device is in a transmission state only during the period when a call button provided on the wireless communication device is pressed, and voice signals collected through the microphone are transmitted as radio waves. The wireless communication device returns to the standby state for reception when the pressing of the call button is stopped (released). In such a wireless communication device, since the transmission and reception of radio waves are interrupted for each utterance, the start and end of a series of conversations in which the transmission and the reception, which is the response, are repeated cannot be clearly known, and the voice thus cannot be recorded properly.

In this background, a general purpose of the present invention is to provide a wireless communication device and a wireless communication method capable of properly recording voice during wireless communication.

A wireless communication device according to an embodiment of the present invention includes: a device state detector that detects a device state, associates the detected device state with whether the device state is a transmission standby state where the user of the wireless communication device can transmit immediately, and outputs the association result as device state information; a signal processor that encodes and decodes a voice signal and the device state information; a transmitter that transmits a transmission voice signal and the device state information of the wireless communication device encoded by the signal processor to a counterpart device as radio waves; a receiver that receives the radio waves from the counterpart device and outputs the received signal to the signal processor that decodes the received signal into a reception voice signal and the device state information of the counterpart device; a recorder that records the transmission voice signal and the reception voice signal; a memory unit that stores the device state information of the wireless communication device output from the device state detector and the device state information of the counterpart device decoded by the signal processor; and a recording determination unit that determines whether to continue or stop recording performed by the recorder based on the device state information of the wireless communication device and the device state information of the counterpart device that are stored in the memory unit, wherein the recording determination unit determines to stop the recording performed by the recorder if both of the device state information of the wireless communication device and the device state information of the counterpart device stored in the memory unit do not indicate a transmission standby state at the time of termination of transmission of a radio wave pertaining to a voice signal performed by the transmitter or termination of reception of a radio wave pertaining to a voice signal performed by the receiver.

Another embodiment of the present invention relates to a wireless communication method. This wireless communication method includes: performing device state detection that detects a device state, associates the detected device state with whether the device state is a transmission standby state where the user of a wireless communication device can transmit immediately, and outputs the association result as device state information; performing signal processing that encodes and decodes a voice signal and the device state information; transmitting a transmission voice signal and the device state information of the wireless communication device encoded in the signal processing to a counterpart device as radio waves; receiving the radio waves from the counterpart device and outputting the received signal for the signal processing that decodes the received signal into a reception voice signal and the device state information of the counterpart device; recording the transmission voice signal and the reception voice signal; storing the device state information of the wireless communication device output in the device state detection and the device state information of the counterpart device decoded in the signal processing; and performing recording determination that determines whether to continue or stop recording performed in the recording based on the device state information of the wireless communication device and the device state information of the counterpart device that are stored in the storing, wherein in the recording determination, to stop the recording performed in the storing is determined if both of the device state information of the wireless communication device and the device state information of the counterpart device stored in the storing do not indicate a transmission standby state at the time of termination of transmission of a radio wave pertaining to a voice signal performed in the transmitting or termination of reception of a radio wave pertaining to a voice signal performed in the receiving.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 5 is a diagram listing a recording stop determination process;

FIG. 11 is a diagram listing a recording stop determination process according to the second embodiment.

DETAILED DESCRIPTION

Figure 1:
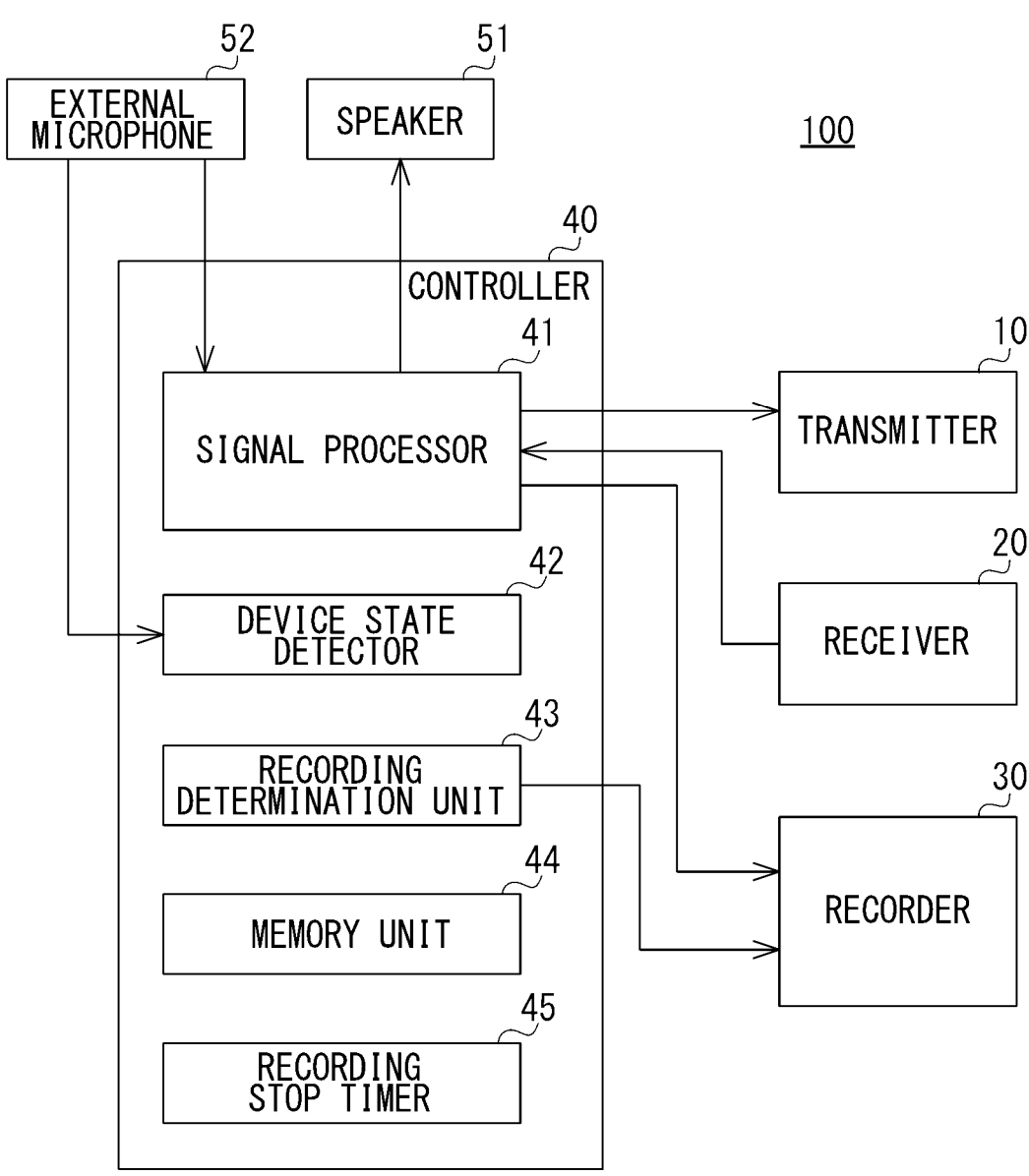
FIG. 1 is a block diagram showing the configuration of a wireless communication device according to the first embodiment.

The invention will now be described by reference to the preferred embodiments. This does not intend to limit the scope of the present invention, but to exemplify the invention.

Hereinafter, the present invention will be described based on preferred embodiments with reference to FIGS. 1-11. The same or equivalent constituting elements and members illustrated in each drawing shall be denoted by the same reference numerals, and duplicative explanations will be omitted appropriately. The dimension of members in the drawings are enlarged or reduced as appropriate to facilitate understanding. Some of the members in each figure may be omitted if they are not important for explanation.

First Embodiment

FIG. 1 is a block diagram showing the configuration of a wireless communication device 100 according to the first embodiment. The wireless communication device 100 includes a transmitter 10, a receiver 20, a recorder 30, a controller 40, and the like and performs wireless communication of voice between the wireless communication device 100 and a counterpart device. The wireless communication device 100 is used in vehicles and as a portable device but is not limited to these uses.

The parts in the wireless communication device 100 are implemented in the hardware by any central processing unit (CPU) of a computer, other electronic elements, or mechanical parts, and in software by a computer program or the like. FIG. 1 depicts functional blocks implemented by the cooperation of hardware and software. Thus, a person skilled in the art should appreciate that there are many forms of accomplishing these functional blocks in various forms in accordance with the components of hardware, software, or the combination of both.

The transmitter 10 modulates voice signals based on a modulation method such as frequency shift keying (FSK) modulation and transmits the voice signals as radio waves. The transmitter 10 inputs a signal for voice to be transmitted, hereinafter referred to as "transmission voice", from a signal processor 41 described later.

The receiver 20 receives radio waves from the counterpart device and outputs demodulated voice signals (hereinafter referred to as "reception voice") to the signal processor 41. The transmitter 10 and the receiver 20 are assumed to transmit and receive radio waves in a set frequency band. The transmitting frequency and the receiving frequency may be variable according to the communication method.

The recorder 30 is a data storage device, for example, such as a memory card and a hard disk storage device and records transmission voice from the wireless communication device 100 and reception voice from the counterpart device. The transmission voice and the reception voice that have been signal processed in the signal processor 41 are input to the recorder 30. The recorder 30 stores a series of transmission voices and reception voices in a single electronic file from the start of voice communication to the end of communication between the wireless communication device 100 and the counterpart device.

The controller 40 includes a signal processor 41, a device state detector 42, a recording determination unit 43, a memory unit 44, and a recording stop timer 45. The signal processor 41 performs signal processing such as compression coding processing and digital conversion on transmission voices, reception voices, and various data signals. The signal processor 41 acquires a voice signal from the user through an external microphone 52 and outputs an encoded transmission voice signal to the transmitter 10. The signal processor 41 outputs a voice signal obtained by decoding the signal input from the receiver 20 into a reception voice signal to the speaker 51.

The external microphone 52 is, for example, a handy-type voice input device. The external microphone 52 is hung on a hook, hereinafter referred to as "on-hook state", which is not shown in the figure when the external microphone 52 is not transmitting voice to the counterpart device. The external microphone 52 is used by the pressing of the call button while being in a state where the external microphone 52 is removed from the hook by the user when starting voice transmission, which is hereinafter referred to as "off-hook state".

The external microphone 52 outputs a signal indicating that the external microphone 52 is in the off-hook state when the user removes the external microphone 52 from the hook, and outputs a signal indicating that the external microphone 52 is in the on-hook state when the user hangs the external microphone 52 up on the hook. The on-hook state and the off-hook state are collectively referred to as a hook state, which is a device state. The user is in a state of not being able to transmit immediately when the external microphone 52 is in the on-hook state. The user is in a state of not being able to transmit immediately, a transmission standby state, when the external microphone 52 is in the off-hook state. In other words, it can be considered that when a device state that is in the transmission standby state is detected, the device is in a state where transmission will continue thereafter, while when a device state that is not in the transmission standby state is detected, the device is in a state where no further transmission will be made.

The external microphone 52 is also provided with a PTT-type call button, hereinafter referred to as "PTT button", which is not shown in the figure. When the user wants to transmit, he/she removes the external microphone 52 from the hook causing the microphone 52 to be in the off-hook state, and then presses the PTT button so as to cause the signal processor 41 to start voice transmission. A signal resulting from pressing the PTT button is output from the external microphone 52 to the signal processor 41.

The device state detector 42 detects a signal indicating the hook state, a hook state signal, output by the external microphone 52. The device state detector 42 outputs the hook state signal to the signal processor 41 and the memory unit 44 as device state information that associates the hook state of the external microphone 52 with the transmission standby state. The external microphone 52 is provided with a switch not shown in the figure that is activated by the attachment to or detachment from the hook, for example, and the device state detector 42 detects the hook state of the external microphone 52 by detecting the on/off of the switch.

The signal processor 41 outputs the hook state signal for the external microphone 52 input from the device state detector 42, a hook state notification request requesting the hook state, and the transmission voice signal described above to the transmitter 10. The transmitter 10 transmits the hook state signal, the hook state notification request, and the transmission voice signal input from signal processor 41 to the counterpart device. The receiver 20 receives a hook state signal, a hook state notification request, and a reception voice signal from the counterpart device as radio waves and outputs the received signals to signal processor 41. The signal processor 41 outputs the hook state signal from the counterpart device that has been decoded to the memory unit 44.

The memory unit 44 is composed of a data storage device such as random access memory (RAM), flash memory, etc., and stores the hook state of the wireless communication device and the hook state of the counterpart device that have been input.

The recording determination unit 43 determines whether to continue or stop recording of transmission voice and reception voice at the recorder 30 based on the hook state signal from the wireless communication device and the hook state signal from the counterpart device stored in the memory unit 44. The recording determination unit 43 determines to stop recording performed by the recorder 30 if both of the hook state signals of the wireless communication device 100 and the counterpart device stored in the memory unit 44 indicate an on-hook state, that is, if both of the devices are in a state of not being able to transmit immediately, at the time of the termination of the transmission of a radio wave pertaining to a voice signal performed by the transmitter 10 or the termination of the reception of a radio wave pertaining to a voice signal performed by the receiver 20.

Being triggered by the termination of the transmission of the radio wave pertaining to the voice signal performed by the transmitter 10 or the termination of the reception of the radio wave pertaining to the voice signal performed by receiver 20, the recording determination unit 43 causes the recording stop timer 45 to measure elapsed time after the termination of the transmission or the reception. The recording determination unit 43 determines to stop the recording performed by the recorder 30 when the elapsed time measured by the recording stop timer 45 reaches a preset end time. However, if the next transmission or reception starts before the end time is reached, the recording determination unit 43 stops the measuring of the elapsed time by the recording stop timer 45 and clears the elapsed time. The recording stop timer 45 measures time based on a clock signal or the like.

Figure 2:
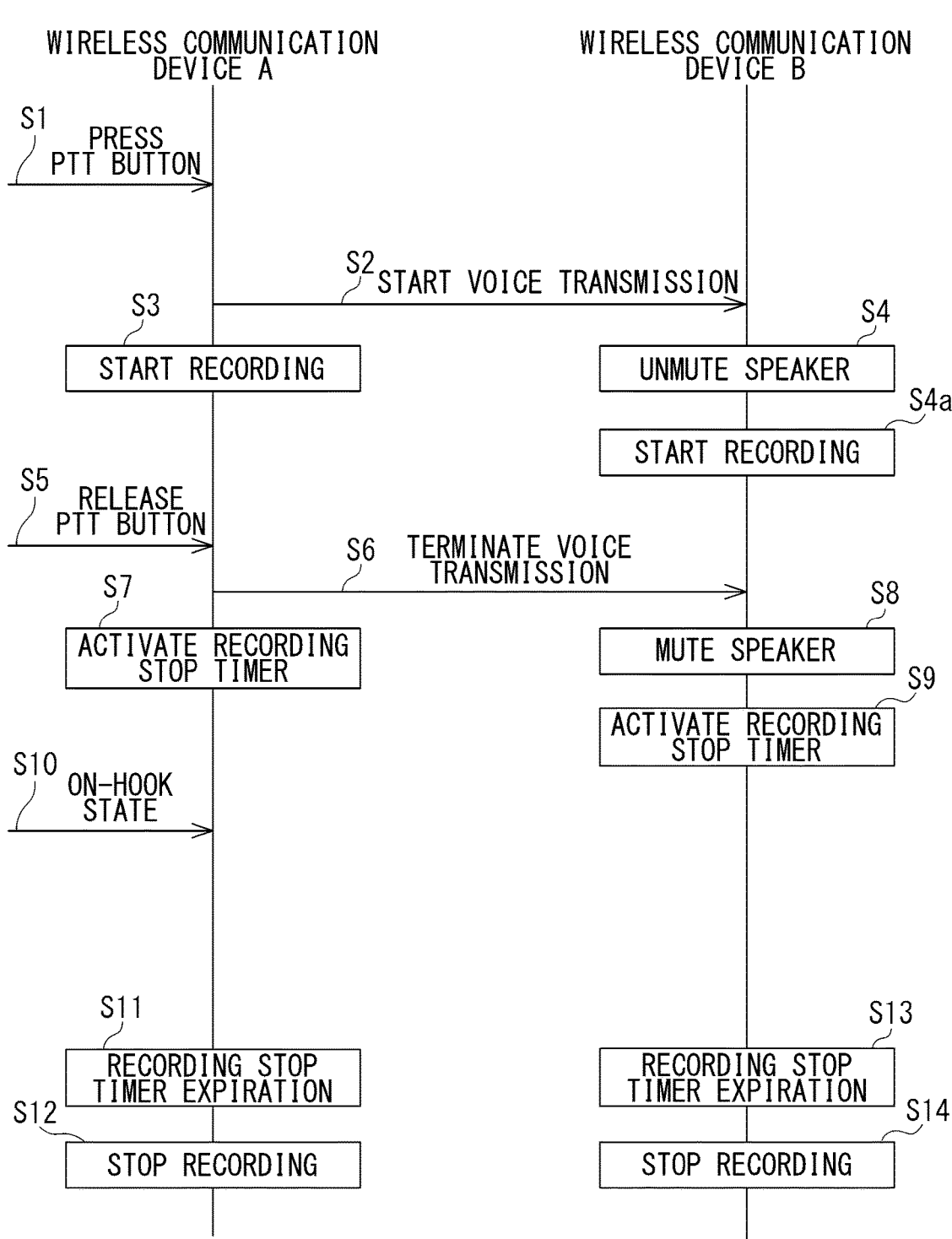
FIG. 2 is a sequence diagram showing a procedure of a recording process performed by wireless communication devices.

First, an explanation will be made regarding the conventional recording function. FIG. 2 is a sequence diagram showing a procedure of a recording process performed by wireless communication devices 100. FIG. 2 shows an example where voice communication is performed between a wireless communication device A, which is a host device, and a wireless communication device B, which is a counterpart device, and recording is stopped through a timer operation.

The wireless communication device A removes the external microphone 52 from the hook and starts transmitting a voice signal to the wireless communication device B (S2) by the pressing of the PTT button on the external microphone 52 (S1). The recording determination unit 43 of the wireless communication device A causes the recorder 30 to start recording transmission voice based on the start of transmission of the voice signal by the signal processor 41 (S3). Based on the reception of the voice signal transmitted from the wireless communication device A by signal processor 41, the wireless communication device B unmutes the speaker 51 of the wireless communication device B and outputs reception voice (S4). The recording determination unit 43 of the wireless communication device B causes the recorder 30 to start recording the reception voice (S4a).

By releasing the PTT button on external microphone 52 (S5), the wireless communication device A terminates the transmission of voice signals to the wireless communication device B (S6). The recording determination unit 43 of the timer 45 based on the termination of the transmission of a voice signal (S7). The wireless communication device B mutes the speaker 51 of the wireless communication device B based on the termination of the reception of voice signals from the wireless communication device A (S8), and the recording determination unit 43 activates the recording stop timer 45 (S9).

The external microphone 52 of the wireless communication device A is hung on the hook by the user and goes into the on-hook state (S10). The recording determination unit 43 of the wireless communication device A stops recording performed by the recorder 30 (S12) when the activated recording stop timer 45 expires after reaching the preset time (S11). Further, the recording determination unit 43 of the wireless communication device B stops recording performed by the recorder 30 (S14) when the activated recording stop timer 45 expires after reaching the preset time (S13).

Figure 3:
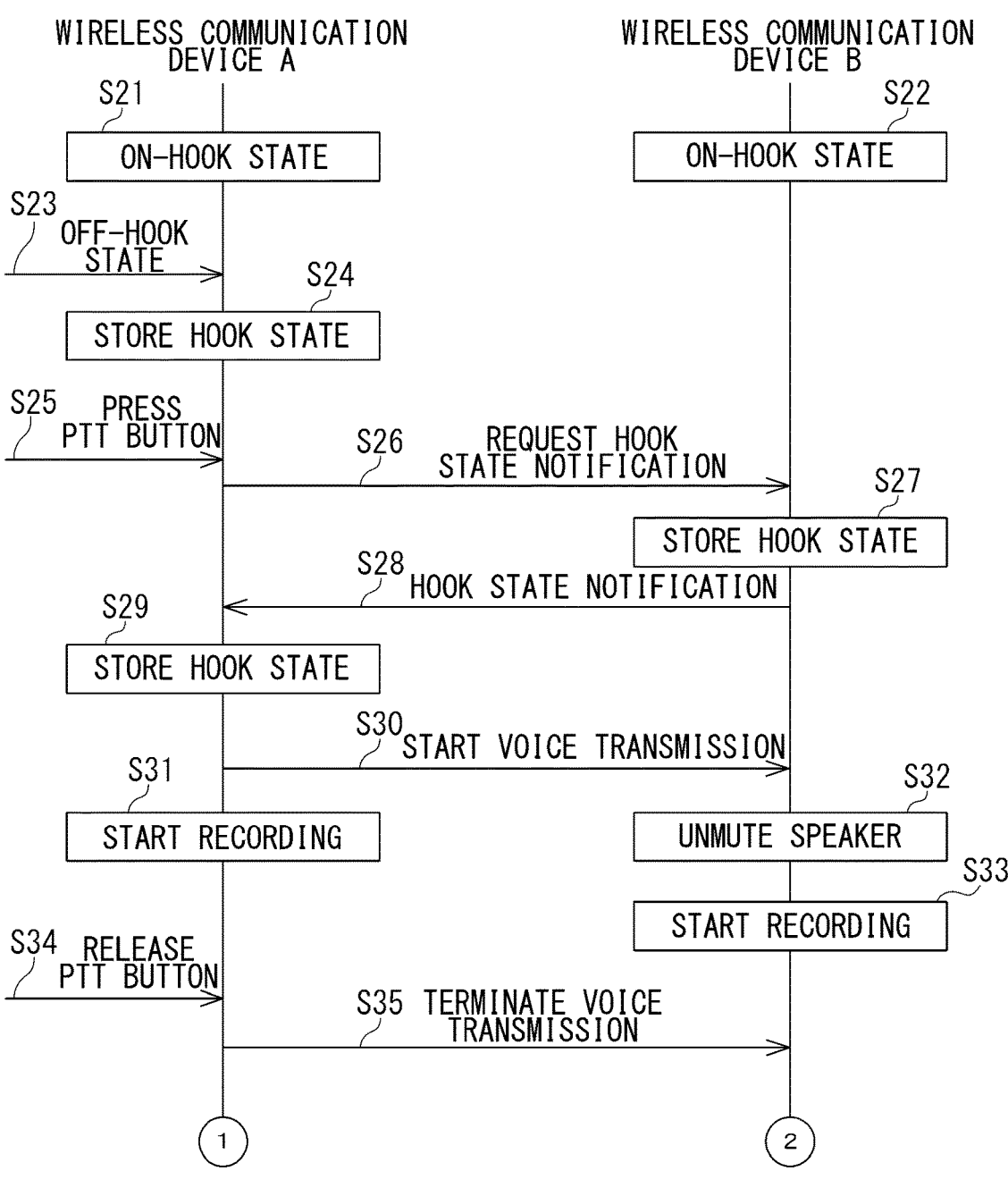
FIG. 3 is a sequence diagram showing a procedure of a recording process performed by wireless communication devices according to the first embodiment.
Figure 4:
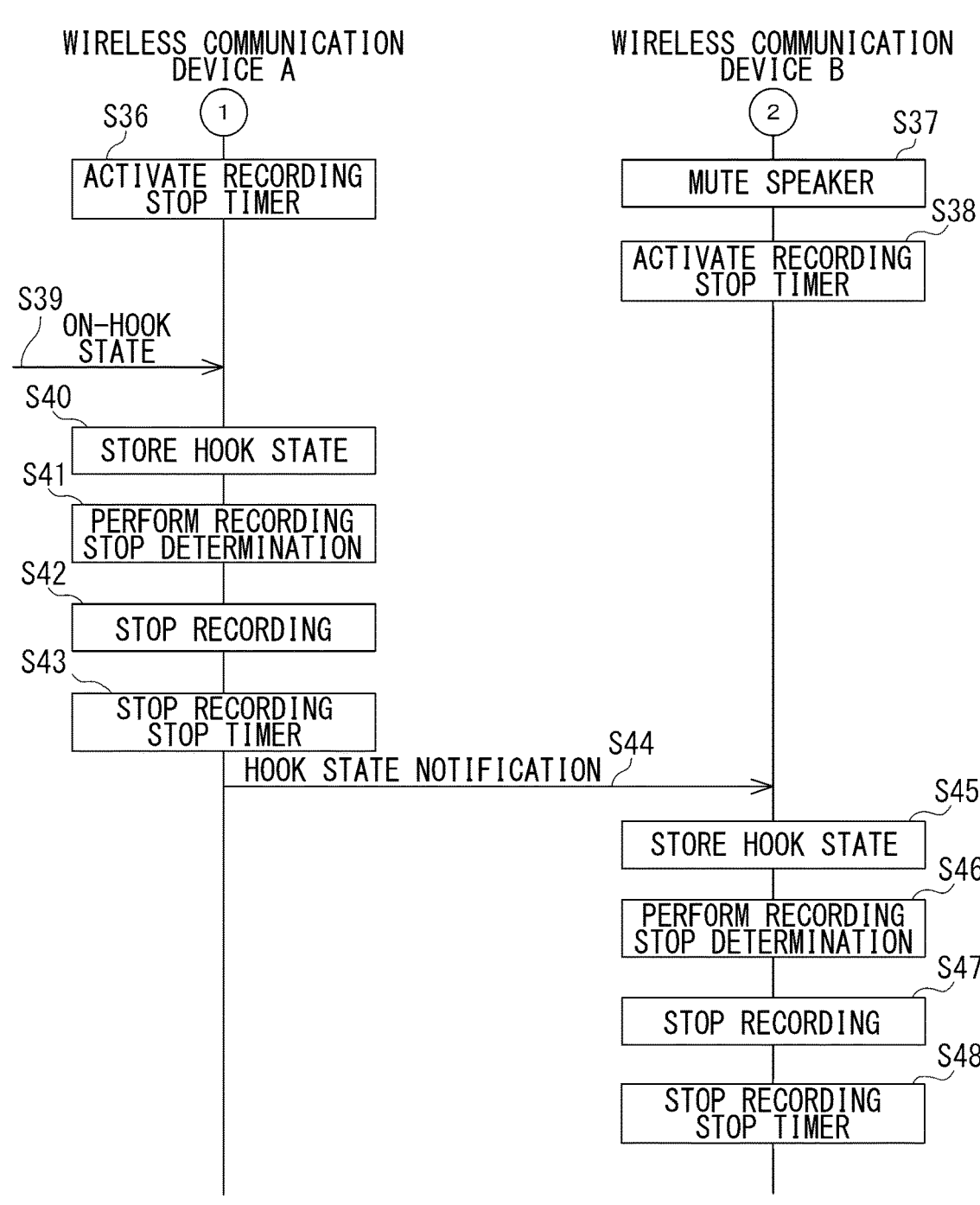
FIG. 4 is a sequence diagram showing the continuation of the sequence in FIG. 3.

FIG. 3 is a sequence diagram showing a procedure of a recording process of wireless communication devices 100 according to the first embodiment. FIG. 4 is a sequence diagram showing the continuation of the sequence in FIG. 3. FIG. 3 and FIG. 4 show examples where voice communication is performed between a wireless communication device A, which is a host device, and a wireless communication device B, which is a counterpart device, and recording is stopped through notification of a hook state signal.

First, the external microphone 52 of the wireless communication device A is in the on-hook state (S21), and the external microphone 52 of the wireless communication device B is also in the on-hook state in the same way (S22). The wireless communication device A goes into the off-hook state when the external microphone 52 is removed from the hook (S23), and stores a hook state signal that is from the wireless communication device A, which indicates the off-hook state, in the memory unit 44 of the wireless communication device A (S24).

In the wireless communication device A, the PTT button of the external microphone 52 is pressed in order to transmit a voice signal (S25). The signal processor 41 of the wireless communication device A transmits the hook state of the wireless communication device A to the wireless communication device B in the form of data as a hook state signal before transmitting the voice signal, and transmits a hook state notification request requesting the hook state of the wireless communication device B (S26).

The wireless communication device B receives the hook state signal and the hook state notification request from the wireless communication device A, and stores the hook state signal that is from the wireless communication device A, which indicates the off-hook state, in the memory unit 44 of the wireless communication device B (S27). The signal processor 41 of the wireless communication device B transmits the hook state signal that is from the wireless communication device B to the wireless communication device A by data transmission as a hook state notification (S28). The wireless communication device A receives the hook state notification from the wireless communication device B, and stores the hook state signal that is from the wireless communication device B, which indicates the on-hook state, in the memory unit 44 of the wireless communication device A (S29).

The wireless communication device A starts voice transmission to the wireless communication device B (S30). The recording determination unit 43 of the wireless communication device A causes the recorder 30 to start recording transmission and reception voice based on the start of voice transmission performed by the signal processor 41 (S31). Upon receiving voice transmitted from the wireless communication device A, the wireless communication device B unmutes the speaker 51 of the wireless communication device B (S32), and the recording determination unit 43 of the wireless communication device B causes the recorder 30 to start recording transmission and reception voice (S33).

Upon detecting the release of the PTT button of the external microphone 52 (S34), the wireless communication device A notifies the wireless communication device B of the termination of voice transmission (S35) and terminates voice transmission. The recording determination unit 43 of the timer based on the termination of the voice transmission and starts measuring the elapsed time (S36). The wireless communication device B mutes the speaker 51 of the wireless communication device B based on the termination of the reception of voice from the wireless communication device A (S37), and the recording determination unit 43 activates the recording stop timer and starts measuring the elapsed time (S38).

The external microphone 52 of the wireless communication device A is hung on a hook by the user and goes into the on-hook state (S39). The wireless communication device A stores the hook state signal that is from the wireless communication device A, which indicates the on-hook state, in the memory unit 44 of the wireless communication device A (S40).

The wireless communication device A performs a recording stop determination process based on FIG. 5 (S41). FIG. 5 is a diagram listing a recording stop determination process.

As shown in FIG. 5, recording continues when the external microphones 52 of the wireless communication devices A and B are in the off-hook state. The recording continues when one of the external microphones 52 of the wireless communication devices A and B is in the off-hook state. The recording is stopped when both of the external microphones 52 of the wireless communication devices A and B are in the on-hook state.

An explanation will be continued while referring back to FIG. 4. Since the memory unit 44 of the wireless communication device A stores information indicating that both of the external microphones 52 of the wireless communication devices A and B are in the on-hook state, the wireless communication device A stops recording (S42), and then stops the recording stop timer activated in step S36 (S43).

The signal processor 41 of the wireless communication device A gives notice of the hook state signal that is from the wireless communication device A, which indicates the on-hook state, to the wireless communication device B by data transmission as a hook state notification (S44). The wireless communication device B stores the hook state signal that is from the wireless communication device A, which indicates the on-hook state, in the memory unit 44 of the wireless communication device B (S45). The wireless communication device B performs the recording stop determination process based on FIG. 5 (S46), and since the memory unit 44 of the wireless communication device B stores information indicating that both of the wireless communication devices A and B are in the on-hook state, the wireless communication device B stops the recording (S47). Next, the wireless communication device B stops the recording stop timer activated in step S38 (S48).

The wireless communication device A immediately stops recording if the state of the external microphone 52 of the wireless communication device B stored in the memory unit 44 is also the on-hook state when the wireless communication device A terminates voice transmission and further goes into the on-hook state of the external microphone 52, in other words, a state in which immediate transmission cannot be done. This allows the wireless communication device A to stop recording before the recording stop timer expires, and all transmitted voice signals can thus be recorded without fail while suppressing unnecessary recording of silence.

In the wireless communication device B, recording can also be stopped before the recording stop timer expires based on the fact that the external microphones 52 of the wireless communication devices A and B have gone into the on-hook state, and all received voice is thereby recorded without fail while suppressing unnecessary recording of silence.

Figure 6:
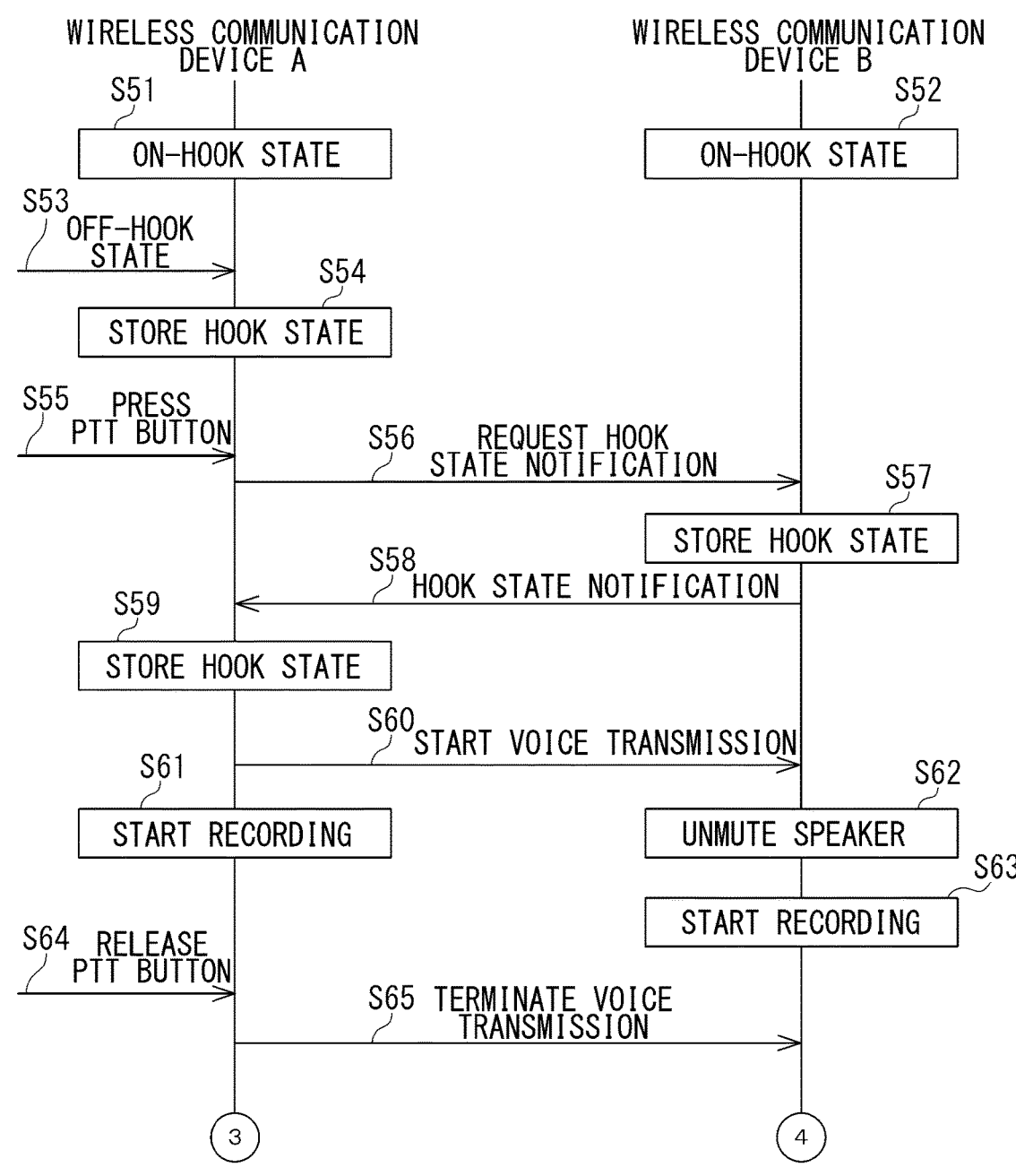
FIG. 6 is a sequence diagram showing a procedure of another recording process performed by the wireless communication devices.
Figure 7:
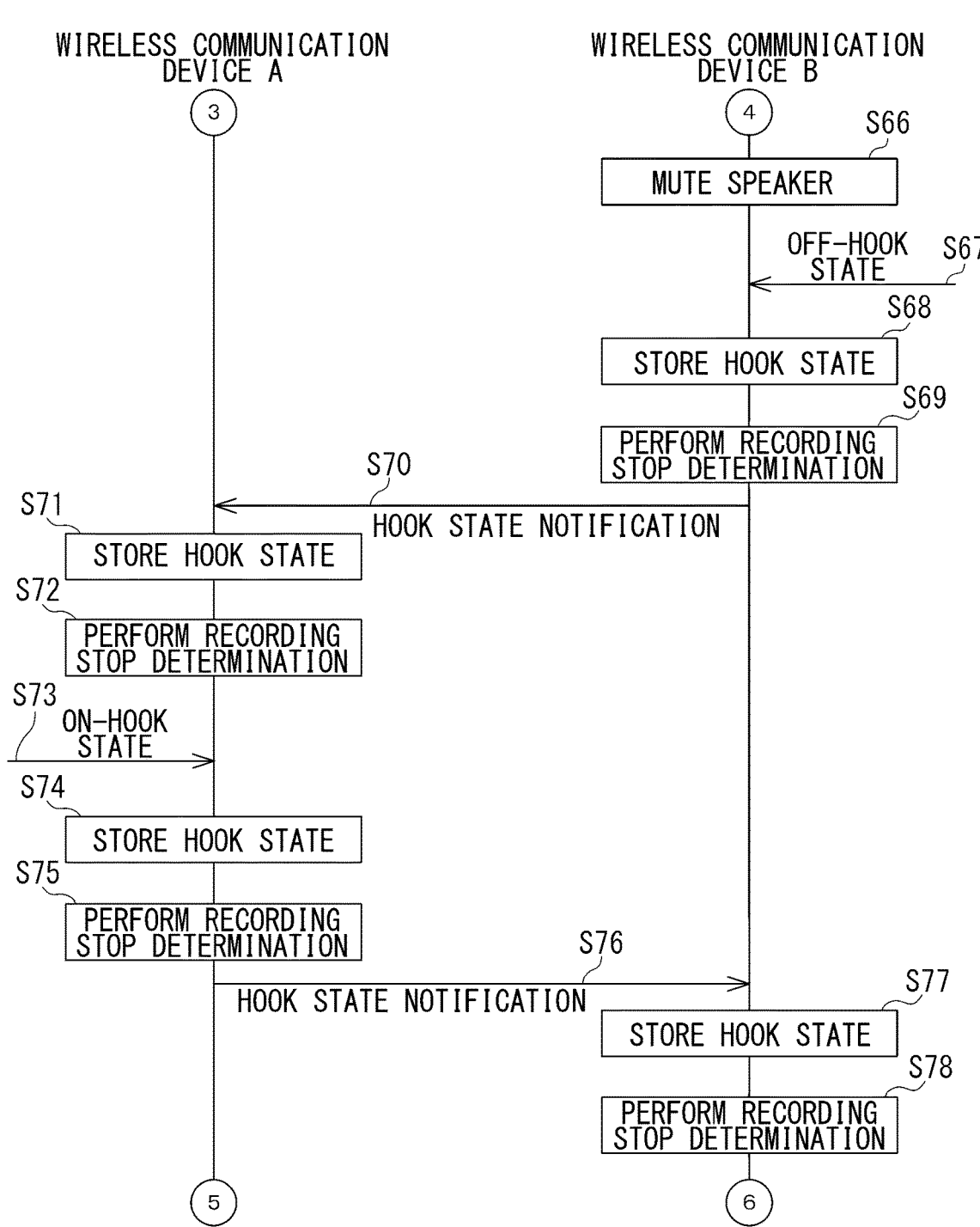
FIG. 7 is a sequence diagram showing the continuation of the sequence in FIG. 6.
Figure 8:
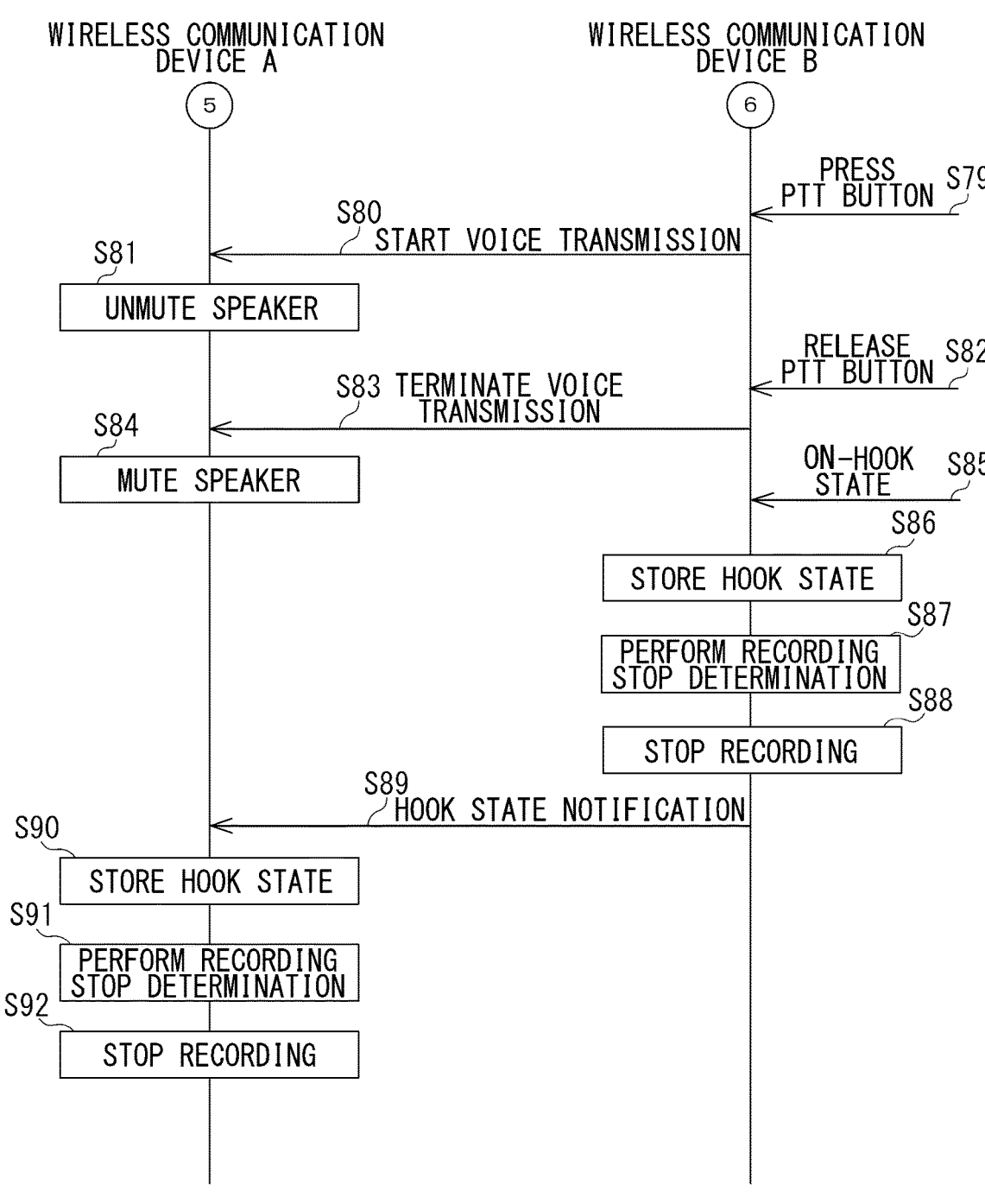
FIG. 8 is a sequence diagram showing the continuation of the sequence in FIG. 7.

FIG. 6 is a sequence diagram showing a procedure of another recording process performed by wireless communication devices 100. FIG. 7 is a sequence diagram showing the continuation of the sequence in FIG. 6. FIG. 8 is a sequence diagram showing the continuation of the sequence in FIG. 7. FIG. 7 and FIG. 8 show examples where voice communication is performed between a wireless communication device A, which is a host device, and a wireless communication device B, which is a counterpart device, and recording is stopped through notification of a hook state signal. This is a case where a series of conversations transmitted and received between the host device and the counterpart device are recorded.

The processes from steps S51 to S65 shown in FIG. 6 are the same as the processes from steps S21 to S35 shown in FIG. 3, and the explanation thereof is thus omitted for simplification. The wireless communication device B mutes the speaker 51 of the wireless communication device B based on the termination of the reception of voice from the wireless communication device A according to step S65 (S66).

The external microphone 52 of the wireless communication device B is removed from the hook and goes into the off-hook state (S67). The wireless communication device B stores the hook state signal that is from the wireless communication device B, which indicates the off-hook state, in the memory unit 44 of the wireless communication device B (S68). The wireless communication device B performs the recording stop determination process based on FIG. 5 (S69). Since the determination in step S69 indicates that both the wireless communication devices A and B are in the off-hook state, the wireless communication device B does not stop recording.

The wireless communication device B transmits a hook state signal that is from the wireless communication device B, which indicates the off-hook state, to the wireless communication device A (S70). The wireless communication device A stores the hook state signal that is from the wireless communication device B, which indicates the off-hook state, in the memory unit 44 of the wireless communication device A (S71). The wireless communication device A performs the recording stop determination process based on FIG. 5 (S72). Since the determination in step S72 indicates that both the wireless communication devices A and B are in the off-hook state, the wireless communication device A does not stop recording.

The external microphone 52 of the wireless communication device A is hung on the hook by the user and goes into the on-hook state (S73). The wireless communication device A stores a hook state signal that is from the wireless communication device A, which indicates the on-hook state, in the memory unit 44 (S74) and performs the recording stop determination process based on FIG. 5 (S75). Since the determination in step S75 indicates that the wireless communication device B is in the off-hook state, the wireless communication device A does not stop the recording.

The signal processor 41 of the wireless communication device A gives notice of the hook state signal that is from the wireless communication device A, which indicates the on-hook state, to the wireless communication device B by data transmission as a hook state notification (S76). The wireless communication device B receives the hook state notification, stores a hook state signal that is from the wireless communication device A, which indicates the on-hook state, in the memory unit 44 of the wireless communication device B (S77), and performs the recording stop determination process based on FIG. 5 (S78). Since the determination in step S78 indicates that the wireless communication device B is in the off-hook state, the wireless communication device B does not stop the recording.

The PTT button on the external microphone 52 of wireless communication device B is pressed in order for the user to transmit voice in response to voice reception from the wireless communication device A (S79). The wireless communication device B starts voice transmission to the wireless communication device A (S80). Upon receiving a voice signal transmitted from the wireless communication device B, the wireless communication device A unmutes the speaker 51 of the wireless communication device A (S81).

By releasing the PTT button on external microphone 52 (S82), the wireless communication device B terminates the voice transmission to the wireless communication device A (S83). The wireless communication device A mutes the speaker 51 of the wireless communication device A based on the termination of the reception of a voice signal from the wireless communication device B (S84).

The external microphone 52 of the wireless communication device B is hung on the hook by the user and goes into the on-hook state (S85). The wireless communication device B stores a hook state signal that is from the wireless communication device B, which indicates the on-hook state, in the memory unit 44 of the wireless communication device B (S86) and performs the recording stop determination process based on FIG. 5 (S87). In the determination in step S87, the recording determination unit 43 of the wireless communication device B determines to stop the recording since the wireless communication devices A and B are in the on-hook state and stops the recording in the recorder 30 (S88).

The signal processor 41 of the wireless communication device B gives notice of the hook state signal that is from the wireless communication device B, which indicates the on-hook state, to the wireless communication device A by data transmission as a hook state notification (S89). The wireless communication device A receives the hook state notification and stores the hook state signal that is from the wireless communication device B, which indicates the on-hook state, in the memory unit 44 of the wireless communication device A (S90). The wireless communication device A performs the recording stop determination process based on FIG. 5 (S91), and since both of the wireless communication devices A and B are in the on-hook state, the wireless communication device A stops the recording (S92).

The wireless communication device A does not stop recording if the external microphone 52 of the wireless communication device B, which is the communication partner, is in the off-hook state even when the wireless communication device A terminates voice transmission and further goes into the on-hook state of the external microphone 52, in other words, a state in which immediate transmission cannot be done. In other words, the wireless communication device A determines that the communication partner is ready to transmit immediately and continues recording. This allows the wireless communication device 100 to record a series of conversations from beginning to end without fail using voice signals transmitted from the wireless communication device 100 and received from the counterpart device.

In the wireless communication device B, when the external microphones 52 of the wireless communication devices A and B go into the on-hook state, recording is stopped according to the recording stop determination in step S87. This allows a series of conversations by the voice received from the wireless communication device A, which is the counterpart device, and the voice transmitted by the wireless communication device to be recorded from beginning to end without fail.

Second Embodiment

Figure 9:
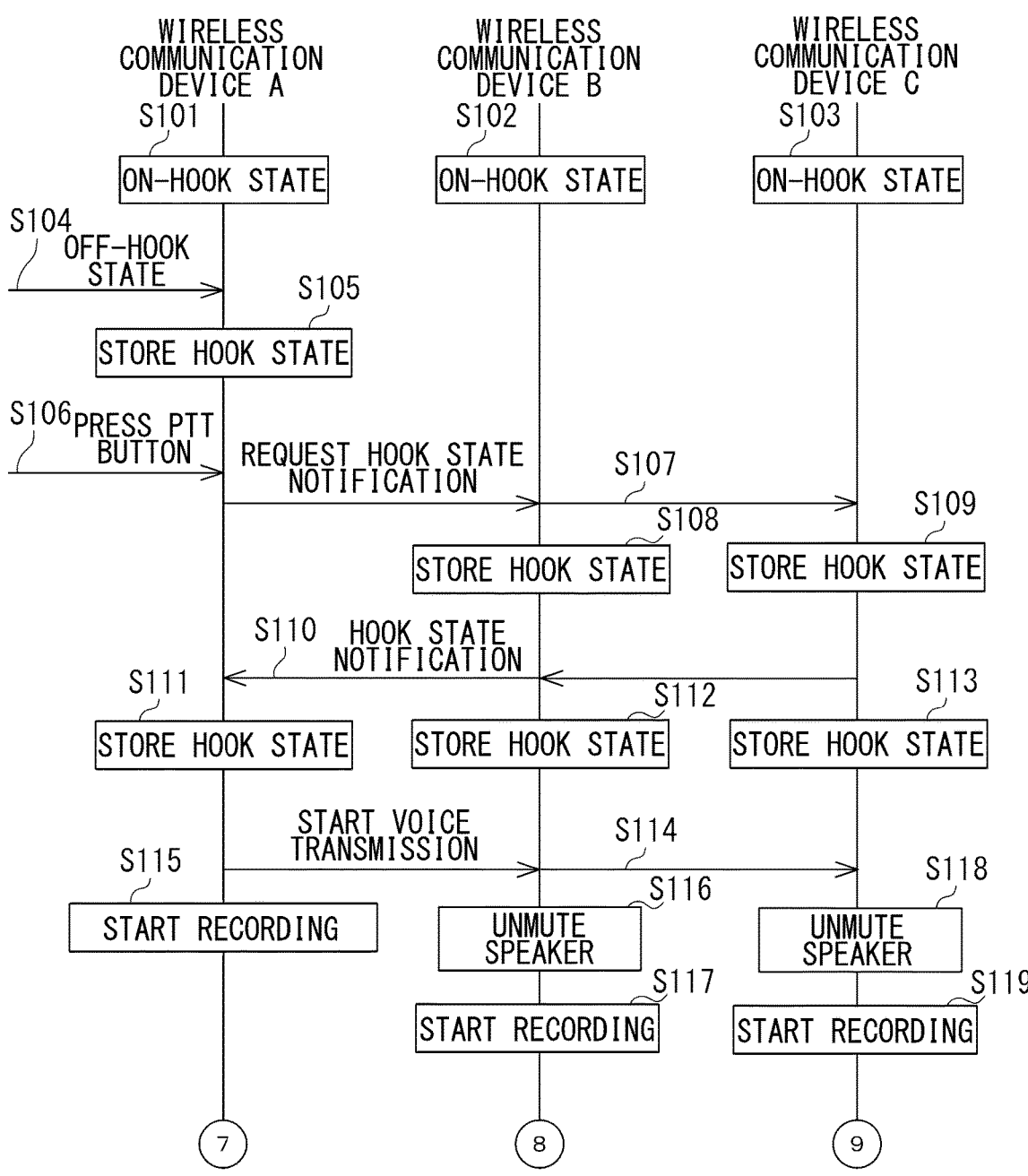
FIG. 9 is a sequence diagram showing a procedure of a recording process performed by wireless communication devices according to the first embodiment.
Figure 10:
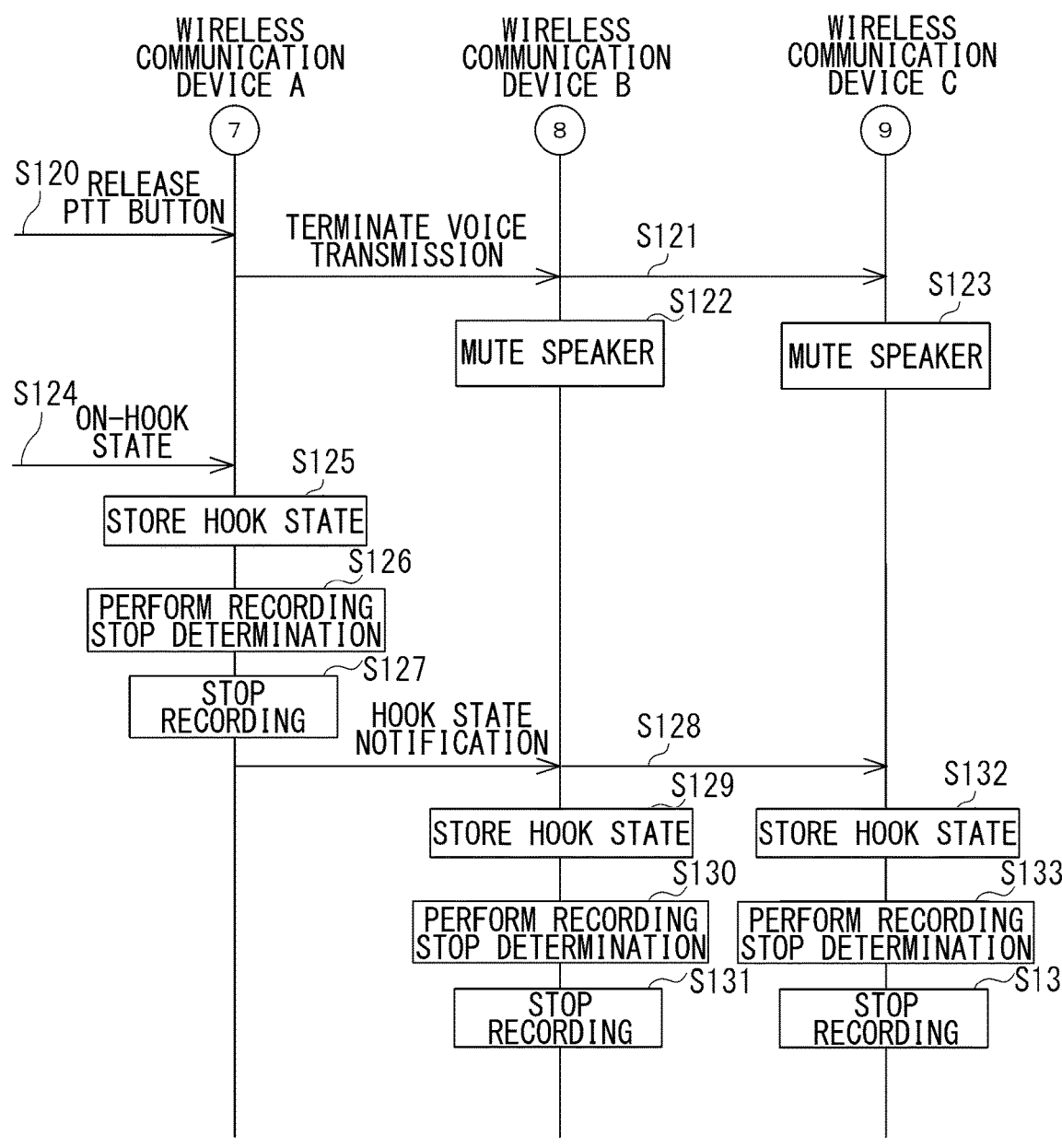
FIG. 10 is a sequence diagram showing the continuation of the sequence in FIG. 9.

FIG. 9 is a sequence diagram showing a procedure of a recording process performed by wireless communication devices 100 according to the second embodiment. FIG. 10 is a sequence diagram showing the continuation of the sequence in FIG. 9. The second embodiment shows examples where voice communication is performed between a wireless communication device A, which is a host device, and wireless communication devices B and C, which are counterpart devices, and recording is stopped through notification of a hook state signal. The wireless communication devices A, B, and C belong to the same group and share a group conversation by voice communication at the same time within the group.

First, the external microphone 52 of the wireless communication device A is in the on-hook state (S101), the external microphone 52 of the wireless communication device B is also in the on-hook state in the same way (S102), and the external microphone 52 of the wireless communication device C is also in the on-hook state (S103). The wireless communication device A falls into the off-hook state when the external microphone 52 is removed from the hook (S104), and stores a hook state signal that is from the wireless communication device A, which indicates the off-hook state, in the memory unit 44 of the wireless communication device A (S105).

In the wireless communication device A, the PTT button of the external microphone 52 is pressed for voice communication (S106). The signal processor 41 of the wireless communication device A transmits the hook state signal from the wireless communication device A to the wireless communication devices B and C in the form of data before transmitting voice transmission, and transmits a hook state notification request requesting notification of the hook state of the wireless communication devices B and C (S107).

The wireless communication device B receives the hook state signal and the hook state notification request from the wireless communication device A, and stores the hook state signal, which indicates the off-hook state, from the wireless communication device A in the memory unit 44 of the wireless communication device B (S108). The wireless communication device C receives the hook state signal and the hook state notification request from the wireless communication device A, and stores the hook state signal that is from the wireless communication device A, which indicates the off-hook state, in the memory unit 44 of the wireless communication device C (S109).

The signal processors 41 of the wireless communication devices B and C transmit hook state signals respectively from the wireless communication devices B and C to wireless communication devices other than the wireless communication devices B and C by data transmission as hook state notifications (S110). In step S110, for example, the signal processor 41 of the wireless communication device B transmits a hook state notification to the wireless communication devices A and C.

The wireless communication device A receives the hook state notifications from the wireless communication devices B and C, and stores the respective hook state signals from the wireless communication devices B and C in the memory unit 44 of the wireless communication device A (S111). The wireless communication device B receives the hook state notification from the wireless communication device C, and stores the hook state signal from the wireless communication device C in the memory unit 44 of the wireless communication device B (S112). The wireless communication device C receives the hook state notification from the wireless communication device B, and stores the hook state signal from the wireless communication device B in the memory unit 44 of the wireless communication device C (S113).

The wireless communication device A starts voice transmission to the wireless communication devices B and C (S114). The recording determination unit 43 of the wireless communication device A causes the recorder 30 to start recording based on the start of voice transmission performed by the signal processor 41 (S115). Upon receiving a voice signal transmitted from the wireless communication device A, the wireless communication device B unmutes the speaker 51 of the wireless communication device B so as to output voice (S116), and the recording determination unit 43 of the wireless communication device B causes the recorder 30 to start recording (S117). Upon receiving a voice signal transmitted from the wireless communication device A, the wireless communication device C unmutes the speaker 51 of the wireless communication device C so as to output voice (S118), and the recording determination unit 43 of the wireless communication device C causes the recorder 30 to start recording (S119).

By releasing the PTT button on external microphone 52 (S120), the wireless communication device A terminates the voice transmission to the wireless communication devices B and C (S121). The wireless communication device B mutes the speaker 51 of the wireless communication device B based on the termination of the reception of a voice signal from the wireless communication device A (S122). The wireless communication device C mutes the speaker 51 of the wireless communication device C based on the termination of the reception of a voice signal from the wireless communication device A (S123).

The external microphone 52 of the wireless communication device A is hung on the hook by the user and goes into the on-hook state (S124). The wireless communication device A stores the hook state signal, which indicates the on-hook state, from the wireless communication device A in the memory unit 44 of the wireless communication device A (S125).

The wireless communication device A performs the recording stop determination process based on FIG. 11 (S126). FIG. 11 is a diagram listing a recording stop determination process according to the second embodiment. As shown in FIG. 11, recording is continued when at least one of the respective external microphones 52 of the wireless communication devices A, B, and C is in the off-hook state. The recording is stopped when all the external microphones 52 of the wireless communication devices A, B, and C are in the on-hook state.

In accordance with the determination in step S126, the wireless communication device A determines to stop the recording since all the wireless communication devices A, B, and C are in the on-hook state and stops the recording in the recorder 30 of the wireless communication device A (S127).

The signal processor 41 of the wireless communication device A gives notice of the hook state signal, which indicates the on-hook state, that is from the wireless communication device A to the wireless communication devices B and C by data transmission as a hook state notification (S128). The wireless communication device B receives the hook state notification and stores the hook state signal that is from the wireless communication device A, which indicates the on-hook state, in the memory unit 44 of the wireless communication device B (S129). The wireless communication device B performs the recording stop determination process based on FIG. 11 (S130), and since all the wireless communication devices A, B, and C are in the on-hook state, the wireless communication device B stops the recording (S131).

The wireless communication device C receives the hook state notification and stores the hook state signal that is from the wireless communication device A, which indicates the on-hook state, in the memory unit 44 of the wireless communication device C (S132). The wireless communication device C performs the recording stop determination process based on FIG. 11 (S133), and since all the wireless communication devices A, B, and C are in the on-hook state, the wireless communication device C stops the recording (S134).

The explanation has been given on the assumption that the number of the wireless communication devices 100 is three, but the number is not limited thereto. Even when performing simultaneous voice communication by a group among three or more wireless communication devices, the wireless communication device 100 also gives notice of hook state signals for the respective external microphones 52, in other words, whether the wireless communication devices 100 are in the transmission standby state to one another so as to acquire information indicating whether the wireless communication devices other than the own device are ready to transmit immediately.

As in the recording stop determination in steps S126, S130, and S133, the wireless communication devices 100 do not stop recording when all the external microphones 52 in the group, including the wireless communication devices 100 itself, are in the off-hook state but stop recording when all the external microphones 52 are in the on-hook state. Thereby, the wireless communication devices 100 stop recording when all the wireless communication devices 100 belonging to the group are not in the transmission standby state, thus allowing the wireless communication devices 100 to record a series of conversations performed within the group from beginning to end without fail.

Further, although not shown in FIGS. 6, 7 and 8 and in FIGS. 9 and 10, an embodiment in combination with a recording stop timer is also possible in the same way as in FIGS. 3 and 4. Thereby, it is possible to prevent the recording from continuing unnecessarily due to the external microphones 52 left without being hang on the hooks.

Exemplary Variation

In the embodiments described above, an example is shown in which whether a wireless communication device 100 is in the transmission standby state is detected by a hook state signal for the external microphone 52 so as to determine the termination of the conversation. Alternatively, whether a wireless communication device 100 is in the transmission standby state may be set by the on/off state of a switch operated by the user. A switch or the like for setting the transmission standby state of a wireless communication device 100 may be also provided on the main unit of the wireless communication device, the illustration of which is omitted, or the like instead of being limitedly provided on the external microphone 52. The transmission standby state of the wireless communication device 100 may be set upon receiving an input operation through voice or the like from the user.

In the embodiments described above, an example is shown in which a signal processor 41 starts transmission using pressing of a PTT button provided on an external microphone 52 as a trigger. However, the trigger for the signal processor 41 to start transmission is not limited to this. For example, a switch or the like having the same function as the that of the PTT button may be also provided on the main unit of the wireless communication device, the illustration of which is omitted, instead of being limitedly provided on the external microphone 52. Alternatively, the signal processor 41 may be configured to start transmission upon receiving an input operation through voice or the like from the user.

In the embodiments described above, an example is shown where a handy-type external microphone 52 is provided. Alternatively, a handy-type or stationary-type microphone may be employed as long as the microphone is capable of converting the user's voice into an electrical signal. Further, the connection between a wireless communication device 100 and an external microphone 52 may be wired or wireless. A connection/disconnection button for the wireless communication device 100 and the external microphone may be used as a substitute for a hook, and the state of the connection/disconnection button on the external microphone may be detected and associated with whether the wireless communication device is in the transmission standby state. Furthermore, not limited to these, any means can be employed as long as the means allows for making an association with whether the wireless communication device is in the transmission standby state. For example, a motion sensor may be provided, and the action of the user may be associated with whether the wireless communication device is in the transmission standby state.

Next, an explanation will be given regarding the features of the wireless communication devices and wireless communication methods according to the embodiments and the exemplary variation. A wireless communication device 100 includes a device state detector 42, a signal processor 41, a transmitter 10, a receiver 20, a recorder 30, a memory unit 44, and a recording determination unit 43. The device state detector 42 detects a device state, associates a hook state, which is the detected device state, with whether the device state is a transmission standby state where the user of the wireless communication device 100 can transmit immediately, and outputs the association result as device state information. The signal processor 41 encodes and decodes a voice signal and the device state information. The transmitter 10 transmits a transmission voice signal and hook state information, which is the device state information of the wireless communication device 100, encoded by the signal processor 41 to a counterpart device as radio waves. The receiver 20 receives the radio waves from the counterpart device and outputs the received signal to the signal processor 41 for decoding the received signal into a reception voice signal and hook state information, which is the device state information of the counterpart device. The recorder 30 records the transmission voice signal and the reception voice signal. The memory unit 44 stores the hook state information of the wireless communication device 100 output from the device state detector 42 and the hook state information of the counterpart device decoded by the signal processor 41. The recording determination unit 43 determines whether to continue or stop recording performed by the recorder 30 based on the hook state information of the wireless communication device 100 and the hook state information of the counterpart device stored in the memory unit 44. The recording determination unit 43 determines to stop the recording performed by the recorder 30 if both of the hook state information of the wireless communication device 100 and the hook state information of the counterpart device stored in the memory unit 44 do not indicate an off-hook state which is a transmission standby state, that is, if both of the devices are in an on-hook state, at the time of the termination of the transmission of a radio wave pertaining to a voice signal performed by the transmitter 10 or the termination of the reception of a radio wave pertaining to a voice signal performed by the receiver 20. This allows the wireless communication device 100 to properly record the voice in a series of conversations transmitted and received without having to stop recording while a conversation continues between the wireless communication devices 100 by confirming that the wireless communication devices 100 are in the on-hook state.

The wireless communication device 100 further includes a recording stop timer 45 activated using the termination of transmission of a voice signal performed by the transmitter 10 or the termination of reception of a voice signal performed by the receiver 20 as a trigger, and measures the elapsed time. The recording determination unit 43 of the wireless communication device 100 stops recording performed by the recorder 30 when the elapsed time reaches a preset time. This allows for the prevention of the wireless communication device 100 from continuing recording unnecessarily due to, for example, the external microphone 52 left without being hang on the hook causing the state of the device to remain in the off-hook state.

Further, since the recorder 30 starts recording and then terminates the recording after recording transmission voice and reception voice involved in a series of conversations, the series of conversations can be stored in a single electronic file. This allows the wireless communication device 100 to reproduce a coherent series of conversations by playing back the single electronic file, and the user-friendliness can thus be improved.

Further, the signal processor 41 transmits a signal requesting notification of hook state information at the counterpart device to the counterpart device via the transmitter 10. This allows the wireless communication device 100 to receive information on the hook state from the counterpart device by means of the signal requesting notification of information on the hook state and to determine whether both of the devices are ready for immediate voice transmission based on the hook state of the wireless communication device 100 and the hook state of the counterpart device.

A wireless communication method includes a device state detection step, a signal processing step, a transmitting step, a receiving step, a recording step, a storing step, and a recording determination step. In the device state detection step, a device state is detected, a hook state, which is the detected device state, is associated with whether the device state is a transmission standby state where the user of the wireless communication device 100 can transmit immediately, and the association result is output as device state information. In the signal processing step, a voice signal and the device state information are encoded and decoded. In the transmission step, a transmission voice signal and hook state information, which is the device state information of the wireless communication device 100, encoded in the signal processing step are transmitted to a counterpart device as radio waves. In the receiving step, the radio waves are received from the counterpart device, and the received signal is output for the signal processing step that decodes the received signal into a reception voice signal and hook state information, which is the device state information of the counterpart device. In the recording step, the transmission voice signal and the reception voice signal are recorded. In the storing step, the hook state information of the wireless communication device 100 output from the device state detector 42 and the hook state information of the counterpart device decoded in the signal processing step are stored. In the recording determination step, whether to continue or stop recording performed in the recording step is determined based on the hook state information of the wireless communication device 100 and the hook state information of the counterpart device stored in the storing step. In the recording determination step, to stop the recording performed by the recorder 30 is determined if both of the hook state information of the wireless communication device 100 and the hook state information of the counterpart device stored in the storing step do not indicate an off-hook state which is a transmission standby state, that is, if both of the devices are in an on-hook state, at the time of the termination of the transmission of a radio wave pertaining to a voice signal performed in the transmitting step or the termination of the reception of a radio wave pertaining to a voice signal performed in the receiving step. This wireless communication method allows both the user of a transmitter-side device and the user of a receiver-side device to confirm that the devices are in an on-hook state in which immediate transmission cannot be done. Thus, communicated voice can be properly recorded without the stopping of the recording during the transmission and reception of the voice of a series of conversations.

The above explanation is made based on the embodiments of the present invention. These embodiments are intended to be illustrative only, and it will be obvious to those skilled in the art that various modifications and changes can be developed within the scope of the claims of the present invention and that such modifications and changes are also within the scope of the claims of the present invention. Accordingly, the description and drawings herein should be treated as illustrative rather than limiting.

What is claimed is:

1. A wireless communication device comprising:
a device state detector that detects a device state, associates the detected device state with whether the device state is a transmission standby state where the user of the wireless communication device can transmit immediately, and outputs the association result as device state information;
a signal processor that encodes and decodes a voice signal and the device state information;
a transmitter that transmits a transmission voice signal and the device state information of the wireless communication device encoded by the signal processor to a counterpart device as radio waves;
a receiver that receives the radio waves from the counterpart device and outputs the received signal to the signal processor that decodes the received signal into a reception voice signal and the device state information of the counterpart device;
a recorder that records the transmission voice signal and the reception voice signal;
a memory unit that stores the device state information of the wireless communication device output from the device state detector and the device state information of the counterpart device decoded by the signal processor; and
a recording determination unit that determines whether to continue or stop recording performed by the recorder based on the device state information of the wireless communication device and the device state information of the counterpart device that are stored in the memory unit, wherein
the recording determination unit determines to stop the recording performed by the recorder if both of the device state information of the wireless communication device and the device state information of the counterpart device stored in the memory unit do not indicate a transmission standby state at the time of termination of transmission of a radio wave pertaining to a voice signal performed by the transmitter or termination of reception of a radio wave pertaining to a voice signal performed by the receiver.

2. The wireless communication device according to claim 1, further comprising:

a recording stop timer that is activated using the termination of the transmission of a voice signal performed by the transmitter or the termination of the reception of a voice signal performed by the receiver as a trigger and that measures elapsed time, wherein the recording determination unit stops recording performed by the recorder when the elapsed time reaches a preset time.

3. The wireless communication device according to claim 1, wherein the recorder records by storing the transmission voice signal and the reception voice signal in one electronic file from the start to the end of the recording.

4. The wireless communication device according to claim 1, wherein the signal processor transmits a signal requesting notification of the device state information at the counterpart device to the counterpart device via the transmitter.

5. A wireless communication method comprising:

performing device state detection that detects a device state, associates the detected device state with whether the device state is a transmission standby state where the user of a wireless communication device can transmit immediately, and outputs the association result as device state information;

performing signal processing that encodes and decodes a voice signal and the device state information;

transmitting a transmission voice signal and the device state information of the wireless communication device encoded in the signal processing to a counterpart device as radio waves;

receiving the radio waves from the counterpart device and outputting the received signal for the signal processing that decodes the received signal into a reception voice signal and the device state information of the counterpart device;

recording the transmission voice signal and the reception voice signal;

storing the device state information of the wireless communication device output in the device state detection and the device state information of the counterpart device decoded in the signal processing; and performing recording determination that determines whether to continue or stop recording performed in the recording based on the device state information of the wireless communication device and the device state information of the counterpart device that are stored in the storing, wherein in the recording determination, to stop the recording performed in the storing is determined if both of the device state information of the wireless communication device and the device state information of the counterpart device stored in the storing do not indicate a transmission standby state at the time of termination of transmission of a radio wave pertaining to a voice signal performed in the transmitting or termination of reception of a radio wave pertaining to a voice signal performed in the receiving.

* * * * *